United States Patent Office 2,802,163
Patented Aug. 6, 1957

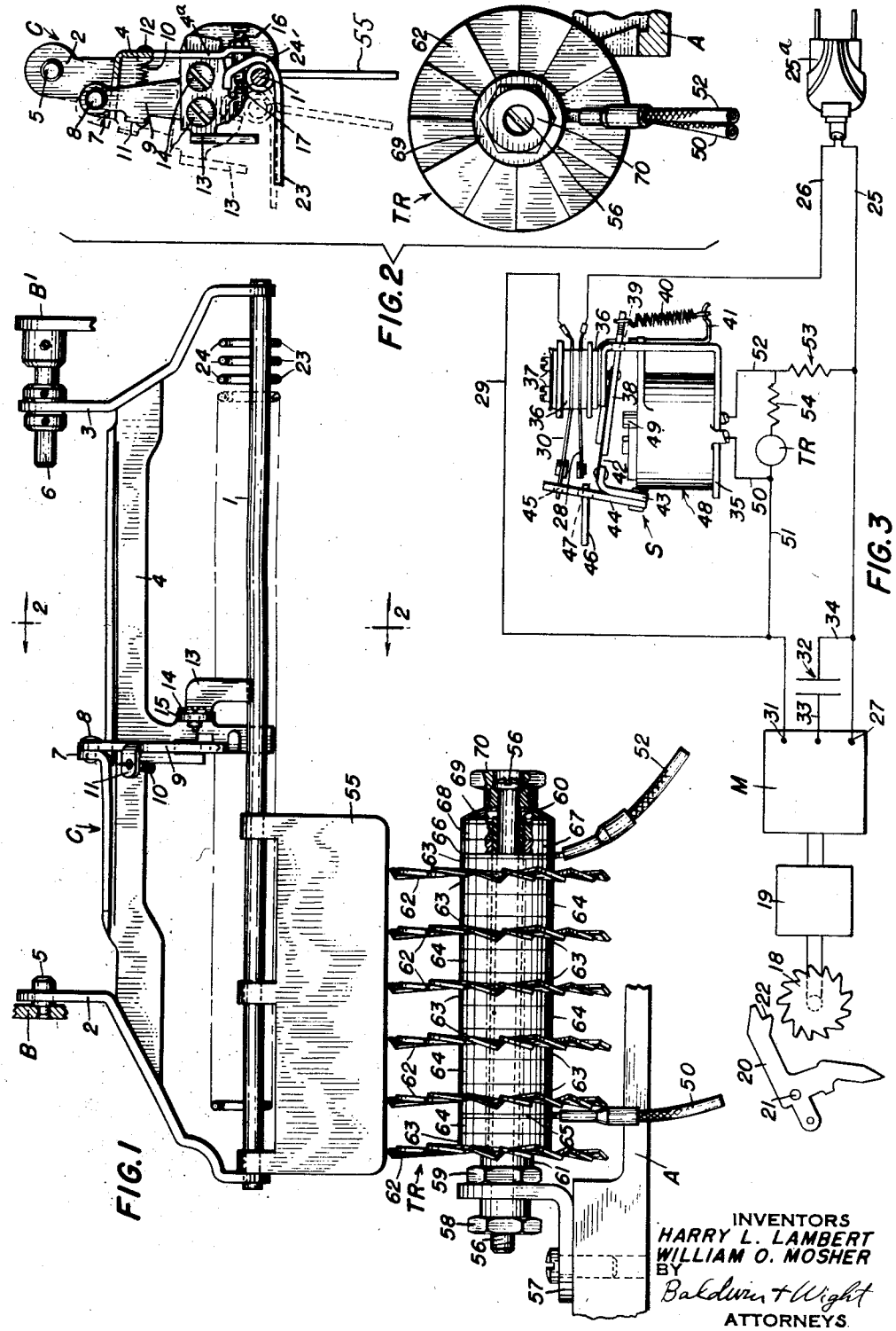

2,802,163

OPERATION CONTROLLING MECHANISM FOR ELECTRIC MOTOR OPERATED TYPEWRITING OR LIKE MACHINES

Harry L. Lambert, West Hartford, and William O. Mosher, Wethersfield, Conn., assignors to Royal McBee Corporation, New York, N. Y., a corporation of New York Application January 27, 1955, Serial No. 484,542

17 Claims. (Cl. 318—460)

This invention relates to operation controlling mechanism for typewriting and like machines, and more particularly to mechanism which is operable for automatically interrupting the supplying of power to the motors of such machines in the event the motors are left running for an extended period unaccompanied by operation of the mechanisms drivable by the motors.

Many electrically operated typewriting and like machines include continuously operable electrically powered operating mechanisms for driving the several machine instrumentalities, e. g. type bars, carriage return mechanism, and so forth. Usually, a driving member such as a roller or toothed snatch roll is continuously rotated by a motor when the machine is conditioned for operation, and operation of an instrumentality is effected by key-controlled engagement of an actuator or interponent with the rotating member. It is not unusual for a typist to leave such a machine unattended with the motor and driving member still running continuously although the mechanism adapted to be operated by the driving member is idle. Periods of useless running of the motor and driving member when the machine is not being used may extend overnight, or for an entire week end, or even longer with resultant useless wasting of electrical power and wearing of the parts. It previously has been proposed to provide timing mechanisms or devices of several kinds for automatically stopping the motors of such machines if they are left running for extended periods without the machines being used for typing. In general, the previously proposed mechanisms or devices have been relatively involved or complicated.

An object of the present invention is to provide an improved control means or arrangement for effecting automatic stopping of a typewriting or like machine motor if it is left running idly for an extended period or is left running unaccompanied by typing or other use of the machine with normal frequency of operation.

Another object of the invention is to provide control means of the class referred to in which an element is responsive to increasing temperature for effecting stopping of the motor, but is normally maintained cool or below its operating temperature by air moved by a part of the machine mechanism when the machine is being used.

A further object of the invention is to provide an improved control means of the character stated including an electrical resistance element having a negative temperature coefficient of resistivity which is adapted to be heated to its operating temperature by current passing through it when the typewriter or like machine mechanism is not being used and the motor is running.

Other objects of the invention will become apparent from a reading of the following description, the appended claims, and the accompanying drawings, in which:

Figure 1 is a fragmentary front elevational view of parts of a typewriter including a universal bar shown associated with a thermally responsive control element in accordance with the invention, certain parts being shown in section;

Figure 2 is a transverse vertical section on the line 2—2 of Figure 1, certain parts being shown in elevation; and Figure 3 is a view showing a switch and associated electromagnet in side elevation in conjunction with a wiring diagram and schematic illustration of electrically powered operating mechanism.

The drawings show only sufficient known or conventional typewriter construction to illustrate a preferred form or embodiment of the invention. Included in the known typewriter construction shown are a fixed frame cross bar A and fixed brackets B—B' on which a universal bar structure, generally designated C, is mounted for oscillation. The universal bar structure C includes a bar or rod 1 to which are fixed two spaced arms 2 and 3 united by a crosspiece 4. The arms 2 and 3 are mounted pivotally on pintles 5 and 6 carried respectively by the brackets B—B'. Secured to an ear 7 on the crosspiece 4 is a pin 8 which pivotally mounts an arm 9 urged counter-clockwise as viewed in Figure 2 by a spring 10 interposed between an ear 11 on the arm 9 and a spring anchoring part 12 of the crossbar 4. The yieldably urged arm 9 cooperates in a known manner with ribbon vibrator mechanism, not shown, the particular construction and operation of which is not directly involved in the present invention. A plate 13 adjustably mounted by screws 14 on an ear 15 formed on the universal bar crosspiece 4 is adapted to cooperate in a known manner with escapement mechanism, not shown. Adjustment of the plate 13 may be effected by loosening the screws 14 and turning a screw 16 threaded into a part 4ᵃ depending from the crosspiece 4, the screw end bearing against a depending part 17 of the plate 13.

Various typewriter instrumentalities, such as the type bars, carriage returning mechanism, tabulating mechanism, and so forth, not shown, may be operated by an electric motor M adapted to drive a rotatable member, e. g. a toothed snatch roll 18, through variable speed transmission mechanism schematically indicated at 19 in Figure 3. The variable speed drive mechanism may be of any suitable kind, such for example as the kind shown in the patent to Hart No. 2,573,197 dated October 30, 1951, or in the co-pending application of Harry L. Lambert Serial No. 459,226 filed September 30, 1954. When the typewriter is in use, the motor M drives the snatch roll 18 continuously, and the latter is adapted to operate the several machine instrumentalities through the medium of pawls normally disengaged from the snatch roll, but adapted to be moved into engagement with the latter by actuation of finger keys, not shown. One such pawl 20 is shown in Figure 3 as being pivoted at 21 and as being in its inactive position in which its nose 22 is disposed out of the path of the teeth of the snatch roll 18. The pivot 21 may be carried on an actuator, not shown, but which may be mounted in the manner shown in the patent to Kupper No. 2,567,945 dated September 18, 1951, and connected to an instrumentality to be operated in the manner shown in the Kupper patent, or in any other suitable manner. As shown in Figures 1 and 2, the typewriting machine is provided with a plurality of universal bar operating links 23 having their rear ends hooked as shown at 24 to embrace the universal bar 1. The front ends of the links 23 are connected respectively to actuators associated with pawls 20, for example as shown in the Kupper Patent No. 2,567,945.

In operation, the snatch roll 18 will be driven continuously and the pawls 20 normally will be positioned so that their noses 22 will not engage the snatch roll until a key associated with one of the pawls in a known manner is depressed so as to effect movement of the pawl nose 22 into engagement with the snatch roll 18. Thereupon, the pawl 20 and its associated actuator are moved bodily to the left to cause operation of the associated instrumentality, e. g. a type bar, with consequent forward moving of the associated link 23 and rocking of the universal bar assembly C about the pivots 5 and 6. After the operation has thus been effected, the pawl nose 22 is moved clear of the snatch roll 18 by the momentum of the parts, and the parts which were actuated by the snatch roll are then returned to normal positions by mechanism which may be of the kind shown in the Kupper Patent No. 2,567,945.

The mechanism described above does not, in itself, constitute the present invention, the invention having to do with other devices or mechanism described hereinafter and the combination of such other devices and mechanism with the known mechanism referred to above.

Electrical power for driving the motor M may be supplied by two conductors 25 and 26 leading from a conventional plug 25ª, the conductor 25 extending from the plug to a motor terminal 27 and the conductor 26 leading to one contact member 28 of a switch S. A conductor 29 leads from the other contact member 30 of the switch S to a motor terminal 31. The motor is shown schematically as being of the capacitor type, a condenser 32 being connected to the motor winding by conductors 33, 34, and 25.

The switch S is of the kind illustrated and described in detail in the co-pending application of Harry L. Lambert and William O. Mosher Serial No. 484,186 filed January 26, 1955. The switch includes a frame 35 on the upper part of which a stack of insulating sheets 36 is mounted by screws 37, the switch contact arms 28 and 30 being so mounted in the stack of insulating sheets 36 as to be insulated from each other and from the screws 37 and frame 35. An armature 38 extends through a slot in the rear part of the frame 35 which thus mounts the armature at 39 for pivotal or rocking movement, the projecting rear end of the armature being urged downwardly by a spring 40 interposed between the armature rear end and a spring anchoring bracket 41 secured to the back of the frame 35. A flexible metallic strip 42 secured at its rear end to the armature 38 extends forwardly beyond the armature and has its front end secured to an angle piece 43 to which is fixed a plate 44 of insulating material which extends upwardly from the angle piece 43 and the armature. The plate 44 is formed with a slot 45 through which the front end portion of the switch contact arm 30 extends, the arrangement being such that when the plate 44 is moved downwardly the contact arm 30 is flexed counterclockwise as viewed in Figure 3 so as to be moved into electric contact with the lower contact arm 28. Suitable mechanism is provided for moving the plate 44 downwardly to close the switch, and in the form shown such mechanism includes a part 46 which extends through a slot 47 formed in the plate 44. The part 46 may be moved downwardly by manually operated mechanism which may, for example, be of the kind shown in co-pending application Serial No. 484,186 previously referred to.

Associated with the switch S is an electromagnetic device 48 mounted on the switch frame 35 and having a core 49 disposed under the armature 38, the arrangement being such that when the electromagnet coil is not energized the spring 40 maintains the armature in the position shown in Figure 3 and thus maintains the switch contact arms 30 and 28 apart, whereas when the armature has been moved downwardly, as by lowering the part 46, the electromagnet 48 will be energized so as to maintain the armature in its lower position and maintain the switch closed during normal operation of the machine. Energization of the electromagnet 48 when the armature has been lowered to close the switch is effected through a conductor 50 connected to the conductor 51 and a conductor 52 connected through a resistor 53 to the conductor 25. The resistor 53, which may be of selected resistance characteristics, is inserted in the conductor 52 for determining the amount of current flowing through the coil of the electromagnet 48 during normal use of the machine.

As explained in the co-pending application Serial No. 484,186, previously referred to, if the supply of electric power to the typewriting machine is interrupted, as for example by detachment of the plug 25ª from its associated socket, the electromagnet 48 will immediately be de-energized, permitting the spring 40 to return the armature 38 to the position shown in Figure 3, thus opening the switch S. When the supply of power again becomes available, as by re-connecting the plug to the socket, the electromagnet 48 will not thereby be energized because the switch will be open. Consequently, the motor M will not start without closing of the switch S by the operator through the mechanism including the part 46.

In accordance with the invention, means are provided for automatically stopping the motor M and the associated driving mechanism in the event the machine is left unattended for an extended period or, otherwise stated, if the machine instrumentalities or mechanism operable by the snatch roll 18 are not operated with normal operating frequency. For this purpose and considered generally, a thermistor or thermal resistance element having a negative coefficient of electric or ohmic resistivity which varies inversely with the temperature of the element may be so connected in the electric circuit and so associated with the typewriter mechanism that if the motor M continues to run for an extended period unaccompanied by operation of the associated mechanism the temperature of the thermistor increases, thereby reducing its resistivity and consequently interrupting the supplying of power to the motor. Otherwise considered, a control element permanently connected to the motor circuit is capable of stopping the motor when the element is heated to a pre-determined temperature is maintained at a lower temperature by air fanned by a moving part of the typewriter mechanism when the mechanism is operated with normal frequency, the element, however, being adapted to increase in temperature when the mechanism is operated with less frequency until the pre-determined temperature is attained, whereupon functioning of the element will effect stopping of the motor.

In the preferred or illustrative embodiment shown in the drawings a thermistor element generally designated TR is connected to one side of the electromagnetic coil 48 through conductors 50 and 51, and is connected through a resistor 54 to the conductor 52 which leads to the other side of the electromagnetic coil 48, the thermistor TR and resistor 54 thus being in series with each other and shunted across the coil 48. The arrangement is such that when the thermistor is maintained at a pre-determined low temperature or within a pre-determined low temperature range its resistivity will be high enough to enable only a small current to pass through it so as not to prevent sufficient current being delivered to the coil 48 to maintain it effectively energized for holding the armature 38 down and the switch S closed. The small current normally passing through the thermistor TR will tend to heat the latter, but if heat is removed from the thermistor, as by air currents, its temperature will remain sufficiently low and consequently its resistance sufficiently high to maintain the coil 48 under sufficient potential to continue its effective energization. If the temperature of the thermistor increases because of not removing heat from it as fast as it is heated by the small current it normally conducts, its resistance is decreased so that the potential applied to the coil 48 will be insufficient to maintain the latter effectively energized, and since the electromagnetic device is thus disabled, the spring 40 will be enabled to rock the armature 38 clockwise as viewed in Figure 3 to open the switch S as previously explained.

As shown in Figures 1 and 2, the thermistor TR is positioned adjacent to a fan blade or part 55 secured to the universal bar 1 so that when the bar 1 is oscillated air moved by the fan or blade 55 will pass over and in contact with the thermistor TR. When the universal bar 1 is operated with normal frequency, air moved in the vicinity of the thermistor TR will maintain the latter below the temperature at which its resistivity would be reduced to a point at which the effective energization of the coil 48 would be terminated. On the other hand, if when the motor is running the operator leaves the machine so that the typewriter mechanism will not be operated, there would be no fanning of the air in the vicinity of the thermistor TR, and the temperature of the thermistor would build up to a point at which it would conduct sufficient current to reduce the energization of the coil 48 until the spring 40 is enabled to move the armature 38 to open the switch S.

Generally considered, thermistors are formed of a class of metallic oxide materials known as semi-conductors which are characterized by negative temperature coefficients of electric resistivity and may be so composed or constructed as to provide operating characteristics varying within a wide range. Thus, the time delay occurring between cessation of operation of the typewriter mechanism with normal frequency and the de-energization of the coil 48 may be pre-determined according to the time found by experience to be most desirable for effecting automatic stopping of the motor M when the typewriter mechanism is not being used. Indeed, it is possible to vary the time delay for such operation from a few milliseconds to as long as thirty minutes. This availability of different time intervals is stated to indicate the wide range of time delays from which a period most suitable for typewriter operation may be pre-determined.

The operating or control characteristics of the thermistor TR may be varied to some extent by selection of the value of the resistor 54, and further by the composition of the thermistor units or the construction of the thermistor assembly. A preferred form of thermistor assembly is shown in Figures 1 and 2 as including a mounting screw or bolt 56 which is secured to a frame mounted bracket 57 by nuts 58 and 59. Surrounding the bolt 56 and extending to the right of the bracket 57 is a tube 60 of electrical insulating material. Surrounding the tube 60 and disposed immediately to the right of the nut 59 is a spacer sleeve 61 of insulating material to the right of which is mounted a multi-blade radiator disc 62 of electrical conducting material. At the right of the disc 62 is a lead washer 63, and immediately at the right of the washer 63 is a thermistor unit disc 64 which may be formed of one of the metallic oxides referred to above as being characterized by negative temperature coefficients of electric resistivity. In contact with this leftmost thermistor unit disc 64 is a connection disc 65 of electrical conducting material which is connected to the conductor 50. To the right of the connection disc 65 is another lead washer 63, and to the right of the last mentioned washer 63 is another radiator disc 62. Considered from left to right, there then follows a series of similarly associated lead washers 63, thermistor disc units 64, and radiator discs 62, all in the sequence or relative arrangement previously pointed out. A second connection disc 66 is abutted against the rightmost lead washer 63 and is engaged on its right by an insulating washer 67 which preferably is of somewhat yieldable material, for example of plastic material such as nylon. Abutting the right hand face of the insulating washer 67 is a metallic washer 68 which is urged toward the left by a conical pressure washer 69 and a nut or sleeve 70. The arrangement is such that all of the radiator discs 62, the lead washers 63, the thermistor unit discs 64 and the connection discs 65 and 66 are clamped in electrical conducting relationship with the radiator members 62 projecting outwardly beyond the thermistor elements 64, air circulation spaces being provided between the projecting portions of contiguous members 62.

The thermistor unit TR, considered as a whole, is positioned in the vicinity of a part of the typewriter mechanism which moves during operation so that air fanned by the moving part will maintain the thermistor below a temperature at which it can effect stopping of the motor. In the preferred construction shown, the multi-blade radiator discs 62 are positioned immediately adjacent to the fan blade 55. This provides for efficient and dependable cooling of the thermistor unit when the typewriter is being used so that when the machine is being operated even by a slow typist the unit will be maintained sufficiently cool to enable the motor to continue to run. If the machine is left with the motor running and the mechanism is not operated, the fanning of air will stop so that the thermistor TR will heat up and the switch S will be opened by discontinuance of effective energization of the coil 48. Once the switch has been opened, it will remain open until closed by the operator, and since cooling of the thermistor will begin immediately after opening of the switch, the thermistor will be restored to its normal operating temperature range by the mere natural movement of air, e. g. by convection, around the unit even though the fan 55 is not operating.

The time delay operating characteristics of the thermistor unit TR may easily be varied by adding or removing thermistor units 64 and radiators 62 as may easily be done because of their being detachably assembled. The selection of the number of units may be determined according to the period of non-operation determined as that at the end of which the motor should be stopped.

The mechanism disclosed embodies the invention in a preferred form, but it is intended that the disclosure be illustrative rather than definitive, the invention being defined in the claims.

We claim:

1. In an electrically operable typewriter or like machine, a motor; mechanism operable by said motor; means providing an electrical circuit for supplying said motor with electrical power; and means including a thermistor having a negative coefficient of ohmic resistivity permanently connected to said circuit and being responsive to continued supplying of power to said motor unaccompanied by operation of said mechanism with normal frequency for automatically opening said circuit.

2. In an electrically operable typewriter or like machine, a motor; mechanism operable by said motor; means providing an electrical circuit for supplying said motor with electrical power; means including a thermistor having a negative coefficient of ohmic resistivity connected to said circuit and being responsive to continued supplying of power to said motor unaccompanied by operation of said mechanism with normal frequency for automatically opening said circuit; and means mounting said thermistor adjacent to a part of said mechanism which moves when said mechanism is operated whereby air mvement caused by movement of said part with normal frequency will prevent heating of said thermistor sufficiently to effect opening of said circuit.

3. In an electrically operable typewriter or like machine, a motor; mechanism including a universal bar operable by said motor; means providing an electrical circuit for supplying said motor with electrical power; means including a thermistor having a negative coefficient of ohmic resistivity connected to said circuit and being responsive to continued supplying of power to said motor unaccompanied by operation of said mechanism with normal frequency for automatically opening said circuit; and means mounting said thermistor adjacent to said universal bar whereby air movement caused by movement of said universal bar with normal frequency will prevent heating of said thermistor sufficiently to effect opening of said circuit.

4. In an electrically operable typewriter or like machine, a motor; mechanism operable by said motor; a fan operable by said mechanism; means providing an electrical circuit for supplying said motor with electrical power; and means including a thermistor having a negative coefficient of ohmic resistivity connected to said circuit and being responsive to non-operation of said fan with normal frequency when said motor is running for automatically opening said circuit and stopping said motor.

5. In an electrically operable typewriter or like machine, a motor; mechanism operable by said motor including a part capable of fanning air when operated; and means for stopping said motor only in consequence of extended non-operation of said mechanism including a temperature responsive element mounted in position to be cooled by air fanned by said part when said mechanism is operated.

6. In an electrically operable typewriter or like machine, a motor; mechanism operable by said motor including a part capable of fanning air when operated; and means for stopping said motor only in consequence of extended non-operation of said mechanism including a temperature responsive variable ohmic resistance element mounted in position to be cooled by air fanned by said part when said mechanism is operated.

7. In an electrically operable typewriter or like machine, a motor; mechanism operable by said motor including a part capable of fanning air when operated; and means for stopping said motor only in consequence of extended non-operation of said mechanism including an element electrically connected with said motor and having an ohmic resistivity which varies with its temperature, said element being mounted in position to be cooled by air fanned by said part when said mechanism is operated.

8. In an electrically operable typewriter or like machine, a motor; mechanism operable by said motor including a part capable of fanning air when operated; and means for stopping said motor only in consequence of extended non-operation of said mechanism including an element electrically connected with said motor and having an ohmic resistivity which varies inversely with its temperature, said element being mounted in position to be cooled by air fanned by said part when said mechanism is operated.

9. In an electrically operable typewriter or like machine, a motor; mechanism operable by said motor; means including a switch providing an electrical circuit for supplying said motor with electrical power; an electromagnetic device for maintaining said switch closed when said mechanism is operated with normal frequency; means including a temperature responsive element for disabling said electromagnetic device in consequence of continued operation of said motor unaccompanied by operation of said mechanism by said motor with normal frequency; and means for opening said switch in response to disabling of said electromagnetic device.

10. In an electrically operable typewriter or like machine, a motor; mechanism operable by said motor; means including a switch providing an electrical circuit for supplying said motor with electrical power; an electromagnetic device for maintaining said switch closed when said mechanism is operated with normal frequency; means for stopping said motor when said mechanism is not being operated with normal frequency comprising an element responsive to increase in its temperature for disabling said electromagnetic device; and a part operable by said mechanism for fanning air in the vicinity of said element to prevent sufficient increase in its temperature to enable it to disable said electromagnetic device when said mechanism is being operated with normal frequency.

11. In an electrically operable typewriter or like machine, a motor; mechanism operable by said motor; means including a switch providing an electrical circuit for supplying said motor with electrical power; an electromagnetic device for maintaining said switch closed when said mechanism is operated with normal frequency; means for stopping said motor when said mechanism is not being operated with normal frequency comprising an element shunted across said electromagnetic device and having a negative coefficient of electrical resistivity whereby to respond to increase in its temperature for disabling said electromagnetic device; and a part operable by said mechanism for fanning air in the vicinity of said element to prevent sufficient increase in its temperature to enable it to disable said electromagnetic device when said mechanism is being operated with normal frequency.

12. In an electrically operable typewriter or like machine, a motor; mechanism operable by said motor; means including a switch providing an electrical circuit for supplying said motor with electrical power; a spring urging said switch to open position; an electromagnetic device for maintaining said switch closed when said electromagnetic device is effectively energized; an element shunted across said electromagnetic device and having a negative coefficient of electrical resistivity whereby to respond to increase in its temperature for terminating effective energization of said electromagnetic device to enable said spring to open said switch; and a part operable by said mechanism for fanning air in the vicinity of said element to prevent sufficient increase in its temperature to enable it to terminate effective energization of said electromagnetic device when said mechanism is being operated with normal frequency.

13. In an electrically operable typewriter or like machine, a motor; mechanism including a universal bar part operable by said motor; means including a switch providing an electrical circuit for supplying said motor with electrical power; a spring urging said switch to open position; an electromagnetic device for maintaining said switch closed when said electromagnetic device is effectively energized; and an element shunted across said electromagnetic device and having a negative coefficient of electrical resistivity whereby to respond to increase in its temperature for terminating effective energization of said electromagnetic device to enable said spring to open said switch, said universal bar part being operable by said mechanism for fanning air in the vicinity of said element to prevent sufficient increase in its temperature to enable it to terminate effective energization of said electromagnetic device when said mechanism is being operated with normal frequency.

14. In an electrically operable typewriter or like machine, a motor; mechanism operable by said motor; means including a switch providing an electrical circuit for supplying said motor with electrical power; a spring urging said switch to open position; an electromagnetic device for maintaining said switch closed when said electromagnetic device is effectively energized; an element shunted across said electromagnetic device and having a negative coefficient of electrical resistivity whereby to respond to increase in its temperature for terminating effective energization of said electromagnetic device to enable said spring to open said switch; a heat radiator connected to said element; and a part operable by said mechanism for fanning air in the vicinity of said radiator and said element when said mechanism is being operated with normal frequency to prevent the amount of increase in the temperature of said radiator and said element which would be required to enable said element to terminate effective energization of said electromagnetic device.

15. In an electrically operable typewriter or like machine, a motor; mechanism operable by said motor; means including a switch providing an electrical circuit for supplying said motor with electrical power; an electromagnetic device for maintaining said switch closed when said mechanism is operated with normal frequency; means including a temperature responsive element for disabling said electromagnetic device in consequence of continued operation of said motor unaccompanied by operation of said mechanism by said motor with normal frequency; means for opening said switch in response to disabling of said electromagnetic device; a heat radiator connected to said element; and a fan operable by said mechanism and effective when said mechanism is being operated with normal frequency for maintaining said radiator and said element below the temperature at which said element disables said electromagnetic device.

16. In an electrically operable typewriter or like machine, a motor; a mechanism operable by said motor including a part capable of fanning air when operated; and means for stopping said motor only in consequence of extended non-operation of said mechanism including a plurality of elements electrically connected in series and being characterized by a negative coefficient of electrical resistivity, a plurality of heat radiator members respectively interposed between and in heat conducting relation to adjacent elements, means for detachably mounting a selected variable number of said elements in such association with each other and with selected numbers of said radiators, and means mounting the assembly of elements and radiators in position to be cooled by air fanned by said part when said mechanism is operated.

17. A thermistor assembly comprising a plurality of elements connected in series and being characterized by a negative coefficient of electrical resistivity; a plurality of heat radiator members respectively interposed between and being spaced by and in heat conducting relation to adjacent elements, said heat radiator members projecting outwardly beyond said elements to provide air circulation spaces between the projecting portions of contiguous spaced radiator members; and means for detachably mounting a selected variable number of said elements in such association with each other and with selected numbers of said radiators.

References Cited in the file of this patent

UNITED STATES PATENTS

| | | |
|---|---|---|
| 2,067,604 | Godsey | Jan. 12, 1937 |
| 2,339,635 | Hall | Jan. 18, 1944 |
| 2,476,329 | Sitzer | July 19, 1949 |
| 2,665,792 | Stauss | Jan. 12, 1954 |

OTHER REFERENCES

Publication, Western Electric Thermistor information sheet, March 1, 1947, issue 1, 7 pages.